United States Patent [19]
Colloff et al.

[11] Patent Number: 5,530,834
[45] Date of Patent: Jun. 25, 1996

[54] SET-ASSOCIATIVE CACHE MEMORY HAVING AN ENHANCED LRU REPLACEMENT STRATEGY

[75] Inventors: Ian G. Colloff, Ascot; Albert S. Hilditch, Wokingham, both of England

[73] Assignee: International Computers Limited, Putney, United Kingdom

[21] Appl. No.: 206,001

[22] Filed: Mar. 3, 1994

[30] Foreign Application Priority Data

Mar. 30, 1993 [GB] United Kingdom ........... 9306647

[51] Int. Cl.⁶ .................................................. G06F 12/12
[52] U.S. Cl. .................... 395/463; 395/421.06; 395/487
[58] Field of Search .............................. 395/200, 400, 395/425, 421.06, 463, 445, 486, 487

[56] References Cited

U.S. PATENT DOCUMENTS 3,949,369  4/1976  Churchill, Jr. .................. 340/172.5
4,511,994  9/1982  Webb et al. ..................... 395/487

FOREIGN PATENT DOCUMENTS 1087189  10/1967  United Kingdom .
1475785   6/1977  United Kingdom .

*Primary Examiner*—Jack A. Lane
*Assistant Examiner*—Fadi A. Stephan
*Attorney, Agent, or Firm*—Lee, Mann, Smith, McWilliams, Sweeney & Ohlson

[57] ABSTRACT

A cache memory contains a number of RAMs. The RAMs are addressed by independent hashing functions, so as to access a set of locations, one in each RAM. If the required data item is resident in the addressed set, it is accessed. Otherwise, the least-recently used location in the set is selected for overwriting with data from main memory. The contents of the RAM location that is about to be overwritten are saved, and then used to access the memory again in order to address a further set of locations. If any of this further set of locations is less recently used than the saved contents, the saved contents are loaded back into that location.

3 Claims, 3 Drawing Sheets

SET-ASSOCIATIVE CACHE MEMORY HAVING AN ENHANCED LRU REPLACEMENT STRATEGY

BACKGROUND OF THE INVENTION

This invention relates to set-associative memories.

One conventional form of set-associative memory comprises a plurality of random access memories (RAMs), each RAM location holding a data item and a tag value identifying the data. An input address is hashed (i.e. transformed by a many-to-one mapping function) to produce a hash address, which is applied in parallel to all the RAMs, so as to select one location in each RAM. The tag values in the addressed locations are then examined to see if the desired data is resident in one of them and, if so, the data is accessed.

If there are n RAMs, so that n locations at a time are examined, the memory is referred to as an n-way set-associative memory and is said to have an associativity of n. The usual choice for the value of n is 2 or 4.

Such a set-associative memory may be used, for example, as a cache memory for a computer system. The aim of a cache is to keep the most useful data of a large amount of data in a small, fast memory in order to avoid having to retrieve the data from the larger, slower main memory. If the required data is in the cache, it is said that a "hit" has occurred; otherwise a "miss" has occurred. The percentage of misses is called the "miss rate". A common engineering problem in designing a cache is to minimize the miss rate while keeping the cache size, the access speed, the power consumption and the amount of implementation logic fixed.

In general, the miss rate of such a cache decreases as its set associativity increases. On the other hand, the cost of implementation increases as set associativity increases. Thus, in general, known caches that deliver minimum miss rates demand large amounts of logic and space to implement, while known caches that are the cheapest to implement deliver higher miss rates.

Another use of set-associative memory is to form a content addressable memory (CAM). The aim of a CAM is to store and reference data according to its contents. For instance, performing a join of two relations within a relational database query can be implemented by first storing the contents of one relation in the CAM, indexed by the join attribute, and then secondly by comparing the rows of the second relation to the CAM using the join attribute again. Content addressable memories can be implemented by fully associative memories but their size is limited by the space demanded by fully associative logic.

One object of the present invention is to provide an improved set-associative memory which is capable of performing as well as conventional set-associative memories of higher set associativity, or better than conventional set-associative memories of the same set associativity. For example, when the set-associative memory is used as a cache, this means that it is able to deliver the same miss rate as conventional caches of larger size and cost, or lower miss rates than conventional caches of the same size and cost.

A second object of the present invention is to provide a CAM using a modified set-associative memory. This allows both much larger CAMs to be constructed and an improved read performance over present CAMs.

SUMMARY OF THE INVENTION

According to one aspect of the invention, there is provided an n-way set-associative memory (where n is an integer greater than 1), comprising a plurality of n RAMs, each RAM location holding a data item and a tag value identifying the data, addressing means for addressing the RAMs to access a set of locations, one in each RAM, and means for examining said set of locations to detect whether a required data item is resident in any of those locations, wherein the addressing means comprises means for performing n independent hashing functions to hash an input memory address into n separate addresses for respectively addressing said RAMs, characterised by means for saving the contents of a RAM location that is about to be overwritten, means for using the saved contents to access the memory again to address a further set of locations, and a means for loading the saved contents into one of said further set of locations.

As will be shown, this "shunting" operation can improve the performance of the set-associative memory, by effectively increasing its set associativity.

According to a second aspect of the invention there is provided a contents addressable memory comprising a plurality of n RAMs (where n is an integer greater than 1), each RAM location holding a data item and a tag value identifying the data, means for performing n independent hashing functions to hash an input memory address into n separate addresses, means for addressing the RAMs with said n separate addresses to access a set of locations, one in each RAM, a means for examining said set of locations to detect whether any of said addressed set of locations is empty and, if so, loading an input data item into that location and a means operative if none of said addressed set of locations is empty, for selecting one of said addressed set of locations for replacement, saving the tag value and data item of the selected location, loading the input data item into the selected location, using the saved contents to access the memory again to address a further set of locations and, if any of the addressed set of locations is empty, loading the saved data item into that location.

As will be shown, a set-associative memory with repeated shunting can deliver a content addressable memory without the need for full associativity thus reducing the logic needed and greatly increasing the size of CAM possible. Further, the read performance of such a "repeated shunting CAM" will be faster than an equivalent fully-associative CAM.

DESCRIPTION OF EMBODIMENTS OF THE INVENTION

A data processing system embodying the invention will now be described by way of example with reference to the accompanying drawings.

Figure 1:
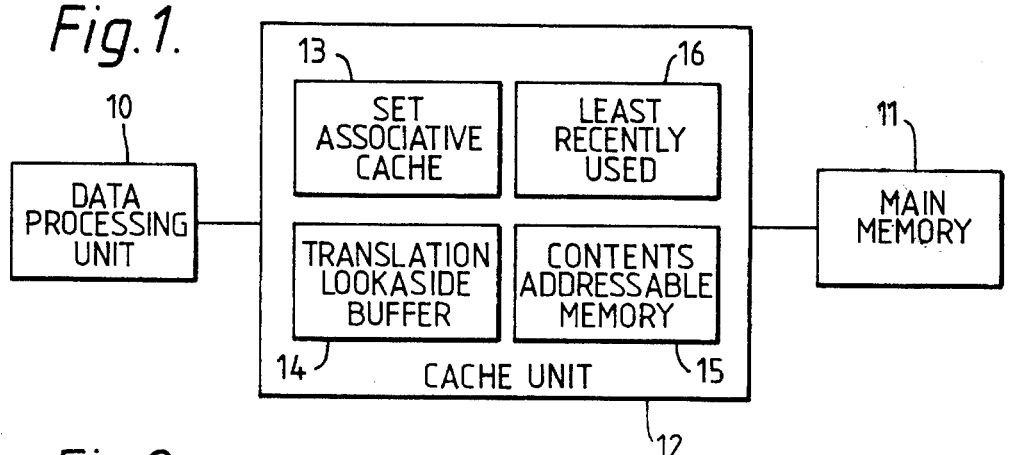
FIG. 1 is a block diagram of a data processing system including a cache comprising a set-associative memory in accordance with the invention.

Referring to FIG. 1, the data processing system comprises a data processing unit 10, a main memory 11, and a virtually addressed cache controller 12 connected between the processing unit and main memory. The cache within the cache controller is smaller and faster than the main memory, and holds copies of the most recently used data items, allowing these items to be accessed by the processing unit without having to retrieve them from the slower main memory.

The cache controller 12 comprises a 4-way set-associative cache 13, a translation look-aside buffer (TLB) 14, a contents addressable memory (CAM) 15, and a least-recently-used replacement mechanism (LRU) 16. The set-associative cache holds the cache data, indexed by the virtual address of the data. The TLB contains a virtual address to real address mapping, indexed by the virtual address, for allowing virtual addresses to be translated into real addresses. The CAM contains a real address to cache location number mapping, indexed by the real address, the purpose of which will be described later. The LRU contains recency-of-usage information for the data items held in the set-associative memory.

SET-ASSOCIATIVE MEMORY WITH SHUNTING

Figure 2:
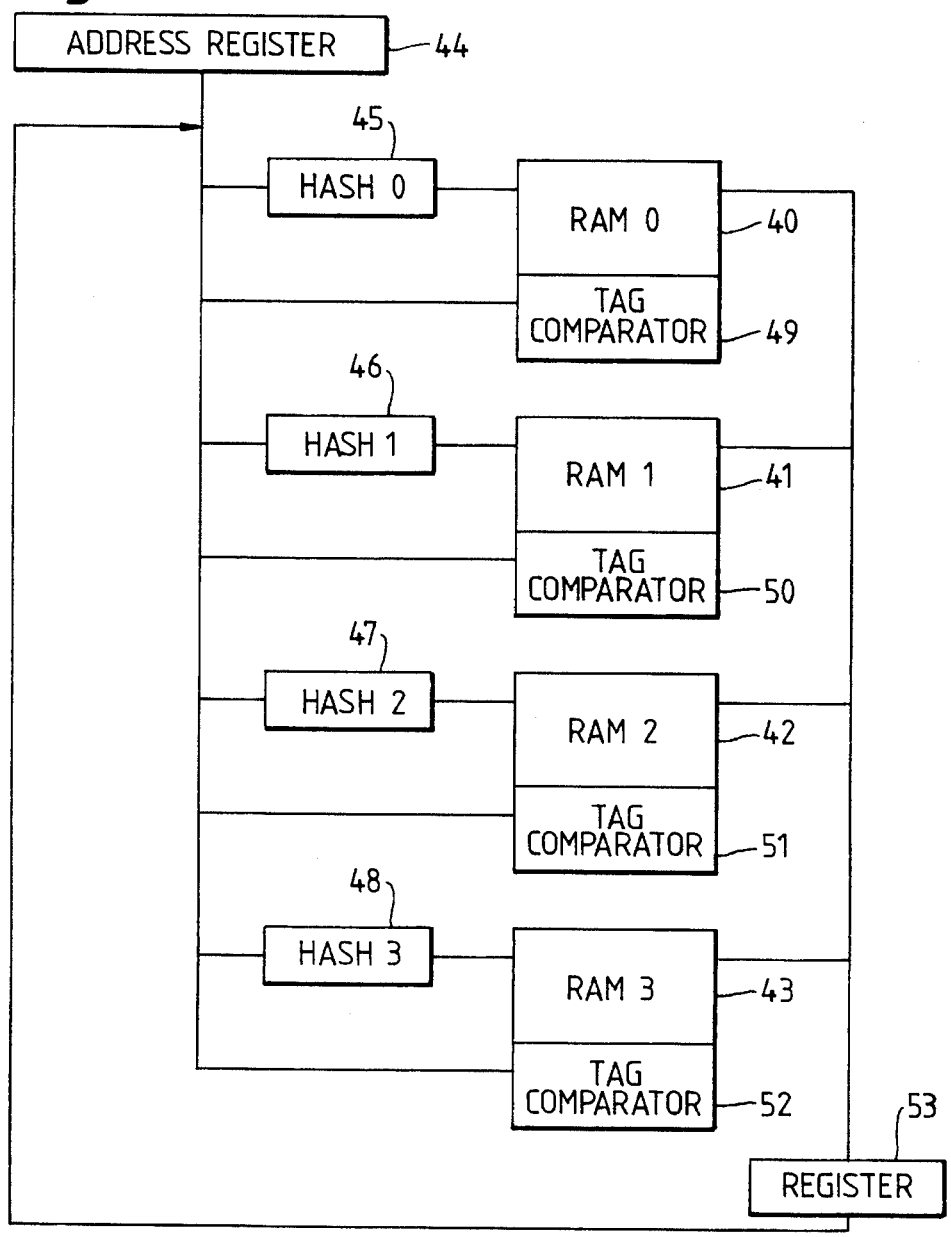
FIG. 2 shows a set-associative memory with the enhancement of "shunting".

FIG. 2 shows the 4-way set-associative memory in more detail. The memory comprises four RAMs 40–43, each of which contains a plurality of addressable locations. Each RAM location holds a data item and a virtual address tag, identifying the data item.

An input virtual memory address is received in an address register 44. This input address is hashed in four different ways by four different efficient hashing functions 45–48 to produce four separate hash addresses. The hashing is done concurrently. A good implementation of the hashing functions can be achieved by using the random matrix hashing algorithm as described in British patent specification GB 2240413. This algorithm generates an arbitrary number of independent hashing functions which can be implemented easily and which allow hashing to be completed within a few simple gate delays.

The four hash addresses are used to address the four RAMs, so as to address four locations, one in each RAM. Because the hashing functions are independent, these four hash addresses will, in general, be different. The virtual address tags in the four addressed locations are compared with the input virtual address by means of comparators 49–52, to see whether any of these locations contains the desired data.

The set-associative memory also includes a register 53, referred to herein as the shunt register, the purpose of which will be described.

OPERATION

The operation of the cache is as follows. When the data processor requires to access a data item, it sends a request to the cache, specifying the virtual address of the required data. The virtual address is loaded into the address register 44, so as to address four locations in the RAMs. If any of the addressed locations contains the required data, a hit has occurred, and the required data can be accessed immediately from that location. The LRU is updated to reflect the usage of this data.

Figure 3:
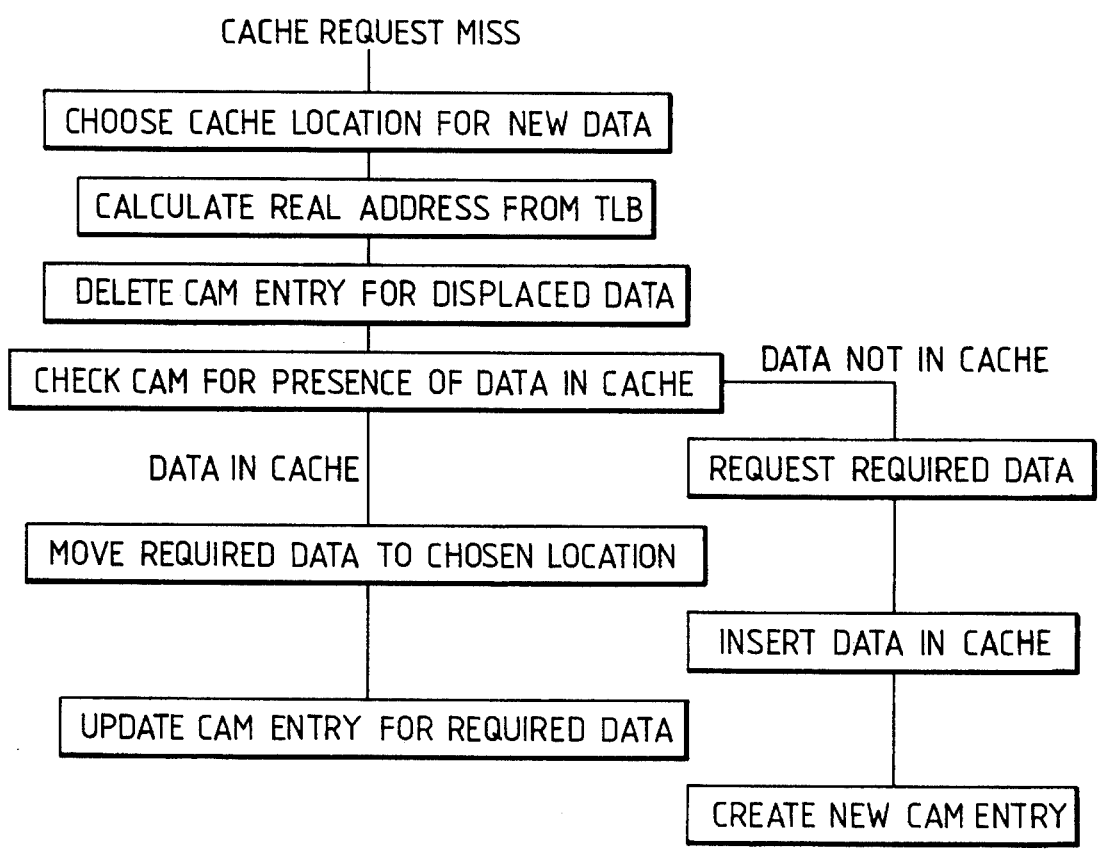
FIG. 3 is a flow chart showing the operation of the cache.

If on the other hand none of the addressed locations contains the required data, a miss has occurred. The operation of the cache in the event of a miss is shown in FIG. 3.

The LRU is accessed to decide which of the four addressed RAM locations is least recently used, and this location is selected for replacement with the desired data. The TLB is then consulted to calculate the real address of the required data. The entry in the CAM for the data to be replaced is deleted.

The CAM is then consulted, using the real address, to determine whether the required data is already resident in the virtual cache, in another cache location under a different virtual address. If the data is present in a different cache location, under a different virtual alias, it is moved to the required cache location, and the entry for that data in the CAM is updated to the new cache location number. If on the other hand the data is not present in the virtual cache under a different virtual alias, it is requested from the main memory using the real address obtained from the TLB.

When the required data has been fetched from the main memory it is stored in the replacement location of the set-associative memory, and a new entry is added to the CAM for the new data.

In the case of a cache miss, after the required data has been requested from the main memory, a shunting procedure is performed, as will be described with reference to FIG. 4. This shunting is performed while the required data is being retrieved from main memory.

Figure 4:
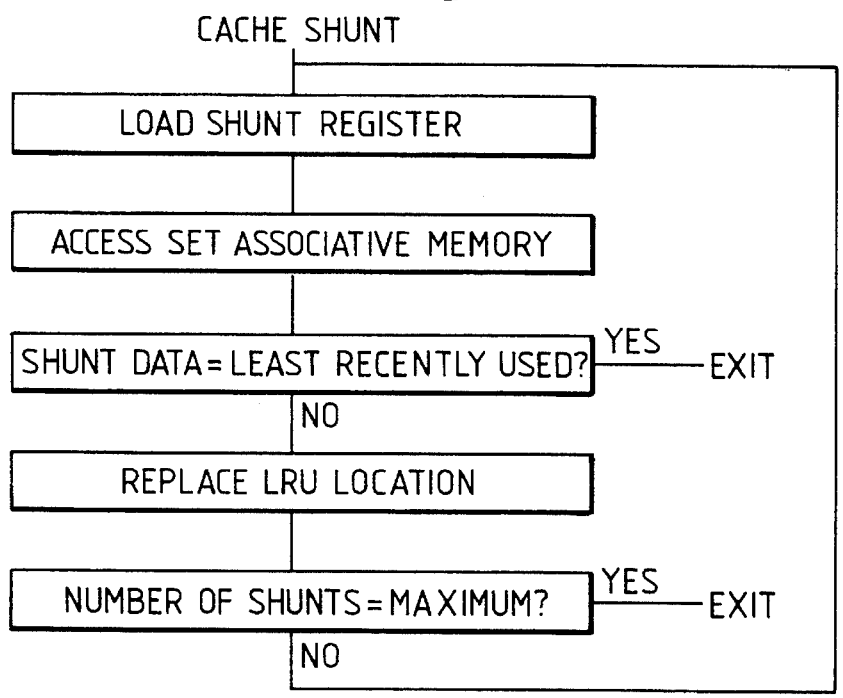
FIG. 4 is a flow chart showing the way that shunting is used in operation of the cache.

Referring to FIG. 4, the first step of the shunting procedure is to load the existing contents of the least-recently used one of the four addressed locations (i.e. the location that will be overwritten by the requested data) into the shunt register 53.

The virtual address tag in the shunt register is then used to address the set-associative memory, in place of the input virtual memory address. Four RAM locations will therefore be accessed, one in each of the four RAMs. One of these locations is where the data was shunted from. However, in general, the other three locations will be different from those accessed by the input virtual memory address, because of the different hashing functions used to access the four RAMs.

The recency of usage of the data in these other three addressed RAM locations is then compared with that of the data in the shunt register. If the data in the shunt register is more recently used than any of those three RAM locations, the RAM location with the oldest access time is replaced with the contents of the shunt register. The existing contents of the RAM location are loaded into the shunt register.

The shunting procedure is repeated, using the new contents of the shunt register, up to a fixed number of times or until it is found that the shunted data is less recently used than the data in any of the addressed RAM locations.

It can be seen that, after shunting is completed, the cache location lost is the least recently used cache location of all those examined. This implies that with a 4-way set-associative cache, shunting once on each miss provides the equivalent of a 7-way set-associative cache. Repeating the shunt each time adds 3 to the effective set associativity.

CONTENTS ADDRESSABLE MEMORY

The set-associative memory shown in FIG. 2 may also be used as a contents-addressable memory (CAM) such as, for example, the CAM 15 of FIG. 1.

Since a CAM is only used to store a finite amount of data, we assume that the number of locations in the RAMs is enough to hold all needed data. This means that we never discard any data in the CAM. However, for the set-associative memory to be used efficiently as a CAM between 20 and 30% of the total locations in the CAM should be surplus to requirement. This means that the expected number of shunts is not greater than 1 and optimum efficiency is ensured.

Figure 5:
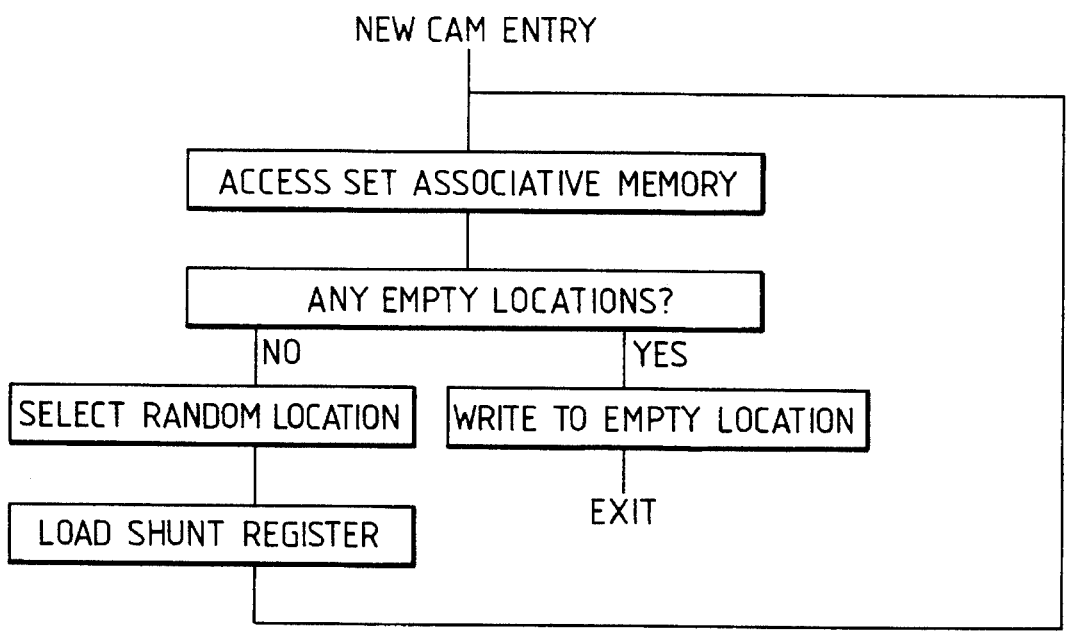
FIG. 5 is a flow chart showing the operation of a contents addressable memory using the set-associative memory of FIG. 2.

Referring to FIG. 5, this shows the operation of the CAM when it is required to load a new data entry into the CAM.

The address of the data is hashed by the four hashing functions to access four RAM locations, one in each RAM. The four addressed locations are then examined to see if any of them is empty. If so, the new data entry is loaded into that location, and the process is complete.

If, on the other hand, none of the four addressed RAM locations is empty, one of these four locations is selected at random, and its contents are loaded into the shunt register 53. The address tag in the shunt register is then used to address the set-associative memory, in place of the original input address. A further three RAM locations will therefore be accessed together with the location from which the data was shunted. This shunting process is repeated until, eventually, an empty RAM location is found, and the new data entry is loaded into that location.

When the CAM is searched for data, the data will always be found in one of the four cache locations initially searched. When adding data to the CAM it may take one or more shunts in order to find an empty cache location, but an empty location will always be found eventually. Deletion of data can be achieved without the need of shunting. A special command is provided for clearing the CAM for reuse.

The CAM described above has a number of advantages over CAMs implemented using a fully associative memory: less logic, less power consumption and faster access times. This will allow much larger CAMs to be constructed than normally possible. The CAM described above has two advantages over CAMs implemented using standard hashing techniques that must resort to inefficient means for resolving hashing collisions: better space utilisation and faster access times.

We claim:

1. A memory system including a main memory and a faster, smaller cache memory, wherein said cache memory comprises:
    a) a plurality of n RAMs (where n is an integer greater than 1), each RAM comprising a plurality of addressable locations;
    b) hashing means for performing n independent hashing functions, to hash an input address into n separate addresses for addressing said RAMs;
    c) LRU means for storing recency-of-use information for each location in said RAMs;
    d) means for applying a memory address as an input to said hashing means, to access a first set of locations in said RAMs, one location in each RAM;
    e) means for using said LRU means to select a least recently used one of said first set of locations;
    f) means for applying data from said least recently used one of said first set of locations as a further input to said hashing means, to access a further set of locations in said RAMs, one location in each RAM; and
    g) means for using said LRU means to select one of said further set of locations that is less recently used than said least recently used one of said first set of locations and for loading said data from said least recently used one of said first set of locations into said one of said further set of locations.

2. A data processing system including a data processing unit, a main memory, and a faster, smaller cache memory, wherein said cache memory comprises:
    a) a plurality of n RAMs (where n is an integer greater than 1), each RAM comprising a plurality of addressable locations;
    b) hashing means for performing n independent hashing functions, to hash an input address into n separate addresses for addressing said RAMs;
    c) LRU means for storing recency-of-use information for each location in said RAMs;
    d) means for applying a memory address as an input to said hashing means, to access a first set of locations in said RAMs, one location in each RAM;
    e) means for using said LRU means to select a least recently used one of said first set of locations;
    f) means for applying data from said least recently used one of said first set of locations as a further input to said hashing means, to access a further set of locations in said RAMs, one location in each RAM; and
    g) means for using said LRU means to select one of said further set of locations that is less recently used than said least recently used one of said first set of locations and for loading said data from said least recently used one of said first set of locations into said one of said further set of locations.

3. A method of operating a memory system including a main memory and a faster, smaller cache memory, the cache memory comprising a plurality of n RAMs (where n is an integer greater than 1), and hashing means for performing n independent hashing functions to hash an input memory address into n separate addresses for addressing said RAMs, said method comprising the steps:
    a) applying a memory address as an input to said hashing means, to access a first set of locations in said RAMs, one location in each RAM;
    b) selecting a least recently used one of said first set of locations;
    c) applying data from said least recently used one of said first set of locations as a further input to said hashing means, to access a further set of locations in said RAMs, one location in each RAM; and
    d) selecting one of said further set of locations that is less recently used than said least recently used one of said first set of locations and loading said data from said least recently used one of said first set of locations into said one of said further set of locations.

* * * * *